United States Patent
Ozturk et al.

(10) Patent No.: US 11,659,465 B2
(45) Date of Patent: May 23, 2023

(54) CHANNEL LOAD-BASED CELL RESELECTION PROCEDURES

(71) Applicant: QUALCOMM Incorporated, San Diego, CA (US)

(72) Inventors: Ozcan Ozturk, San Diego, CA (US); Xiaoxia Zhang, San Diego, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 16/829,973

(22) Filed: Mar. 25, 2020

(65) Prior Publication Data

US 2020/0322861 A1 Oct. 8, 2020

Related U.S. Application Data

(60) Provisional application No. 62/830,394, filed on Apr. 6, 2019.

(51) Int. Cl.
| | |
|---|---|
| *H04W 36/22* | (2009.01) |
| *H04W 16/14* | (2009.01) |
| *H04W 74/08* | (2009.01) |
| *H04W 36/00* | (2009.01) |
| *H04W 36/08* | (2009.01) |

(52) U.S. Cl.
CPC .......... *H04W 36/22* (2013.01); *H04W 16/14* (2013.01); *H04W 36/0022* (2013.01); *H04W 36/08* (2013.01); *H04W 74/0808* (2013.01)

(58) Field of Classification Search
CPC . H04W 36/22; H04W 16/14; H04W 74/0808; H04W 36/0022; H04W 36/08; H04W 48/18

USPC .................. 455/436–445, 450–453; 370/331
See application file for complete search history.

(56) References Cited

U.S. PATENT DOCUMENTS

| | | | |
|---|---|---|---|
| 2014/0098682 A1* | 4/2014 | Cao ................. | H04W 36/00835 370/252 |
| 2015/0264618 A1 | 9/2015 | Jung et al. | |
| 2016/0007260 A1* | 1/2016 | Abraham .......... | H04W 36/0085 370/331 |
| 2016/0127969 A1* | 5/2016 | Pao ....................... | H04W 36/24 455/437 |

(Continued)

FOREIGN PATENT DOCUMENTS

| | | | |
|---|---|---|---|
| WO | 2008157573 A1 | 12/2008 | |
| WO | WO-2008157573 A1 * | 12/2008 | ........ H04W 36/0083 |

(Continued)

OTHER PUBLICATIONS

International Search Report and Written Opinion—PCT/US2020/024935—ISAEPO—dated Jul. 3, 2020.

*Primary Examiner* — Michael Y Mapa
(74) *Attorney, Agent, or Firm* — Harrity & Harrity, LLP \ Qualcomm

(57) ABSTRACT

This disclosure provides systems, methods and apparatuses for channel load-based cell reselection procedures. In one aspect, a user equipment (UE) may identify a channel load and may perform a cell reselection procedure based on the channel load. For example, the UE may perform an intra-frequency cell reselection procedure, an inter-frequency cell reselection procedure, or an inter-radio access technology (RAT) cell reselection procedure.

30 Claims, 6 Drawing Sheets

(56) References Cited

U.S. PATENT DOCUMENTS

| | | |
|---|---|---|
| 2018/0098237 A1 | 4/2018 | Kim et al. |
| 2020/0052803 A1* | 2/2020 | Deenoo ................ H04B 17/318 |
| 2021/0084583 A1* | 3/2021 | Niu ....................... H04W 48/20 |

FOREIGN PATENT DOCUMENTS

| | | |
|---|---|---|
| WO | 2012008957 A1 | 1/2012 |
| WO | 2018141754 A1 | 8/2018 |

\* cited by examiner

CHANNEL LOAD-BASED CELL RESELECTION PROCEDURES

CROSS-REFERENCE TO RELATED APPLICATION

This patent application claims priority to U.S. Provisional Patent Application No. 62/830,394, filed on Apr. 6, 2019, entitled "CHANNEL LOAD-BASED RESELECTION PROCEDURES," and assigned to the assignee hereof. The disclosure of the prior application is considered part of and is incorporated by reference in this patent application.

TECHNICAL FIELD

Aspects of the present disclosure relate generally to wireless communication and more particularly to techniques for channel load-based cell reselection procedures.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include identifying a channel load for one or more cells operating in unlicensed spectrum, which may include shared spectrum, and performing a cell reselection procedure based on the channel load for the one or more cells, where the cell reselection procedure is at least one of an intra-frequency cell reselection, an inter-frequency cell reselection, or an inter-radio access technology (inter-RAT) cell reselection.

In some aspects, performing the cell reselection procedure includes performing the cell reselection procedure based on whether a received signal level satisfies a threshold for performing intra-frequency cell measurements. In some aspects, performing the cell reselection procedure includes performing the cell reselection procedure based on whether a cell selection quality value satisfies a threshold for performing intra-frequency cell measurements. In some aspects, performing the cell reselection procedure includes performing the cell reselection procedure based on whether a cell load value satisfies a threshold for performing intra-frequency cell measurements. In some aspects, the method may include determining a cell list for the cell reselection procedure based on whether the channel load of the one or more cells satisfies a load threshold received from a cell on which the UE is camping.

In some aspects, the method may include ranking the one or more cells for the cell reselection procedure based on a ranking procedure. In some aspects, the method may include selecting a particular cell, of the one or more cells, with a highest ranking based on whether the channel load for the particular cell satisfies a threshold received from the particular cell. In some aspects, the method may include selecting a particular cell, of the one or more cells, for the cell reselection procedure based on a camping criterion for the channel load.

In some aspects, the method may include selecting a higher priority frequency than a current frequency for the cell reselection procedure based on whether the channel load for the higher priority frequency satisfies a threshold for performing intra-frequency cell measurements received from a serving cell and based on the channel load for the current frequency or a current cell. In some aspects, the method may include selecting a higher priority frequency than a current frequency for the cell reselection procedure based on whether the channel load for the higher priority frequency satisfies a threshold during a reselection time period during which the threshold is received by the UE as a broadcast from a serving cell and based on the channel load for the current frequency or a current cell. In some aspects, the method may include selecting a lower priority frequency than a current frequency for the cell reselection procedure based on whether the channel load for the lower priority frequency satisfies a threshold and an availability of one or more other frequencies and based on the channel load for the current frequency or a current cell.

In some aspects, performing the cell reselection procedure includes performing the inter-RAT cell reselection based on determining that each cell, of the one or more cells, does not satisfy one or more cell reselection criteria for the intra-frequency cell reselection or the inter-frequency cell reselection. In some aspects, the channel load is determined based on at least one of an amount of interference on a channel, a total energy on the channel, or a quantity of listen-before-talk (LBT) failures for uplink or downlink on the channel. In some aspects, alone or in combination with any one or more of the first through twelfth aspects, a ranking of cells is based on the channel load.

Another innovative aspect of the subject matter described in this disclosure can be implemented in an apparatus of a UE for wireless communication. The apparatus may include a processing system configured to identify a channel load for one or more cells operating in unlicensed spectrum and perform a cell reselection procedure based on the channel load for the one or more cells, where the cell reselection procedure is at least one of an intra-frequency cell reselection, an inter-frequency cell reselection, or an inter-RAT cell reselection.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to identify a channel load for one or more cells operating in unlicensed spectrum and perform a cell reselection procedure based on the channel load for the one or more cells, where the cell reselection procedure is at least one of an intra-frequency cell reselection, an inter-frequency cell reselection, or an inter-RAT cell reselection.

Another innovative aspect of the subject matter described in this disclosure can be implemented in an apparatus for wireless communication. The apparatus may include means for identifying a channel load for one or more cells operating in unlicensed spectrum and perform a cell reselection procedure based on the channel load for the one or more cells, where the cell reselection procedure is at least one of an intra-frequency cell reselection, an inter-frequency cell reselection, or an inter-RAT cell reselection.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying Figures. Each of the Figures is provided for the purposes of illustration and description, and not as a definition of the limits of the claims.

BRIEF DESCRIPTION OF THE DRAWINGS

Like reference numbers and designations in the various drawings indicate like elements.

DETAILED DESCRIPTION

Figure 1:
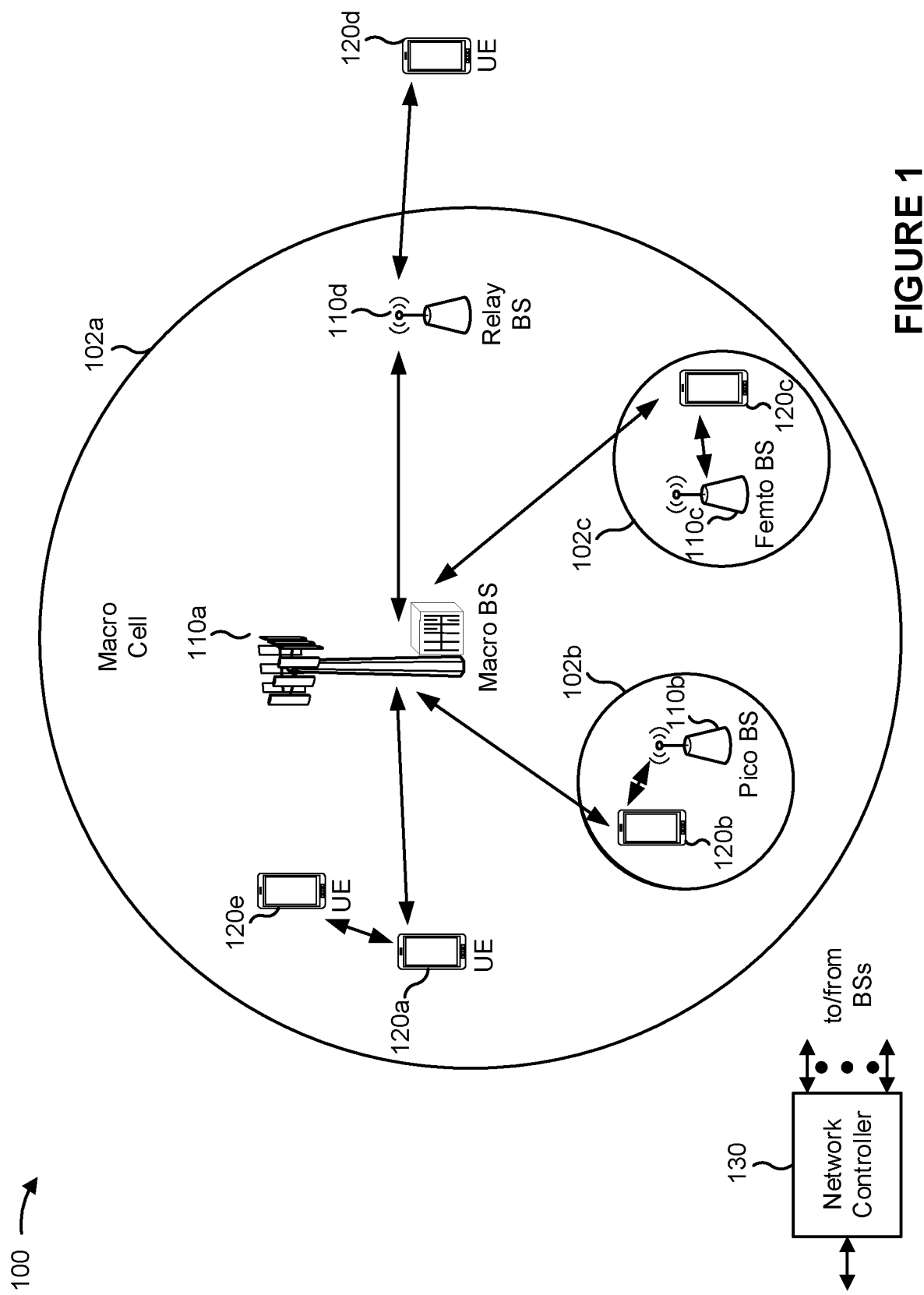
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Some wireless communication frequency ranges may be reserved for unlicensed spectrum, which may be referred to as, and include, shared spectrum, that may be shared by a plurality of operators or entities that may or may not have coordinated operations. In some unlicensed spectrum deployment implementations, different operators or technologies may use different portions of the unlicensed spectrum concurrently. A plurality of operators may deploy, for example NR networks, Wi-Fi networks, or LTE networks, at a single location using the unlicensed spectrum for communication. In such instances, each operator or technology may operate at a common location and use a common set of frequency bands, but remain disassociated from other operators or other technologies. For example, a first BS operated by a first operator may not coordinate with a second BS operated by a second operator. In some other unlicensed spectrum deployment implementations, a single operator may deploy a plurality of ad-hoc cells without a central entity to coordinate the plurality of the ad-hoc cells. For example, a first BS operated by an operator and a second BS operated by the same operator may lack central coordination via a central entity.

By using unlicensed spectrum without central coordination, different channels or carriers may be associated with different channel loads. A channel load may be a total energy on a channel. For example, a UE may attempt to communicate with a BS using unlicensed spectrum, but may use a carrier associated with a threshold channel load. This may result in interference from other BSs using the same channel. Further, using a cell associated with a threshold channel load may result in relatively high levels of latency as a result of many BSs or UEs attempting to reserve resources using, for example, a listen-before-talk (LBT) procedure. In some implementations, and to reduce latency, a BS may schedule a UE for a less loaded channel, relative to other channels of other cells, when the UE is operating in a connected mode. However, when a UE attempts to reselect to a channel of a cell, the UE may inadvertently reselect to a channel exceeding a threshold channel load.

Some aspects described herein may enable performance of a cell reselection procedure using channel load information. For example, a UE may identify a channel load for one or more cells operating in unlicensed spectrum and may perform a cell reselection procedure based on the channel load to attempt to reselect to a cell with less than a threshold channel load. In such instances, the cell reselection procedure may be at least one of an intra-frequency cell reselection, an inter-frequency cell reselection, or an inter-radio access technology (inter-RAT) cell reselection to improve a likelihood that a UE reselects to a channel associated with less than a threshold channel load.

Particular implementations of the subject matter described in this disclosure can be implemented to realize one or more of the following potential advantages. For example, the UE may camp, or latch, onto a cell that provides more reliable paging (such as in an Idle mode), improved throughput, or reduced latency. This may provide improvement relative to performing a cell reselection procedure without using information regarding a channel load to select a cell for a cell reselection procedure. Moreover, by using threshold criteria for evaluating whether to attempt cell reselection for a cell, the UE may reduce a likelihood of using a cell or a frequency that will be congested, thereby improving a likelihood of successfully connecting to a cell with less than a threshold channel load.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

The wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

The wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. The network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). A UE 120 may be included inside a housing that houses components of the UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
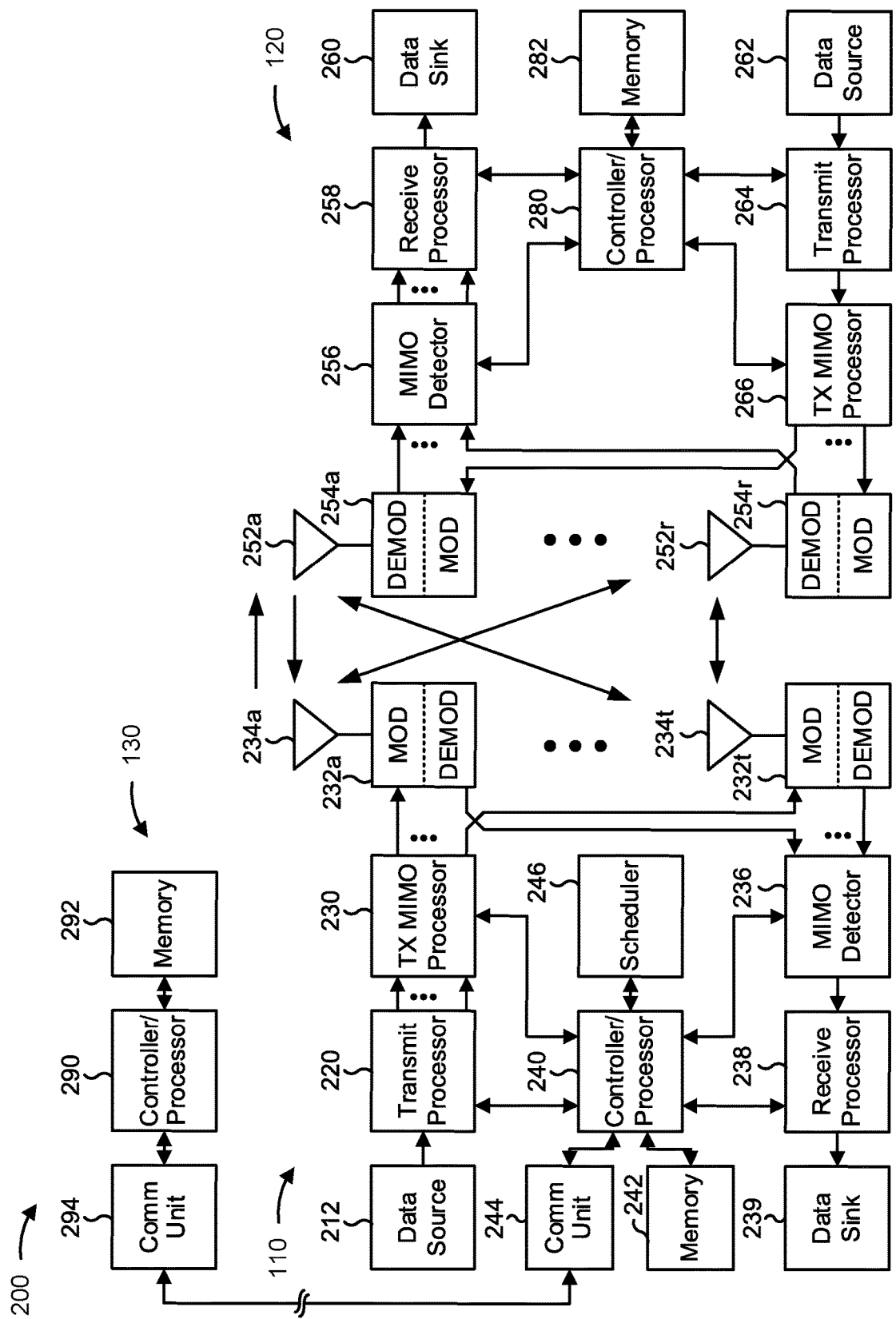
FIG. 2 is a block diagram conceptually illustrating an example of a base station in communication with a user equipment (UE) in a wireless network.

FIG. 2 is a block diagram conceptually illustrating an example 200 of a base station 110 in communication with a UE 120. In some aspects, the base station 110 and the UE 120 may respectively be one of the base stations and one of the UEs in wireless network 100 of FIG. 1. The base station 110 may be equipped with T antennas 234a through 234t, and the UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of the UE 120 may be included in a housing.

On the uplink, at the UE 120, a transmit processor 264 may receive and process data from a data source 262 and control information (for example, for reports including RSRP, RSSI, RSRQ, CQI, etc.) from a controller/processor 280. Transmit processor 264 also may generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, etc.), and transmitted to the base station 110. At the base station 110, the uplink signals from the UE 120 and other UEs may be received by antennas 234, processed by demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to a controller or processor (controller/processor) 240. The base station 110 may include a communication unit 244 and communicate with the network controller 130 via the communication unit 244. The network controller 130 may include a communication unit 294, a controller or processor (controller/processor) 290, and a memory 292.

In some aspects, controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface configured to receive or obtain information, and a second interface configured to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, controller/processor 240 may be a component of a processing system. A processing system may generally refer to a system or series of machines or components that receives inputs and processes the inputs to produce a set of outputs (which may be passed to other systems or components of, for example, the BS 110). For example, a processing system of the BS 110 may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface configured to receive or obtain information, and a second interface configured to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

The controller/processor 240 of the base station 110, the controller/processor 280 of the UE 120, or any other component(s) of FIG. 2 may perform one or more techniques associated with channel load-based cell reselection procedures, as described in more detail elsewhere herein. For example, the controller/processor 280 of the UE 120 or any other component(s) (or combinations of components) of FIG. 2 may perform or direct operations of, for example, the process 400 of FIG. 4 or other processes as described herein. Memories 242 and 282 may store data and program codes for the base station 110 and the UE 120, respectively. A scheduler 246 may schedule UEs for data transmission on the downlink, the uplink, or a combination thereof.

Figure 4:
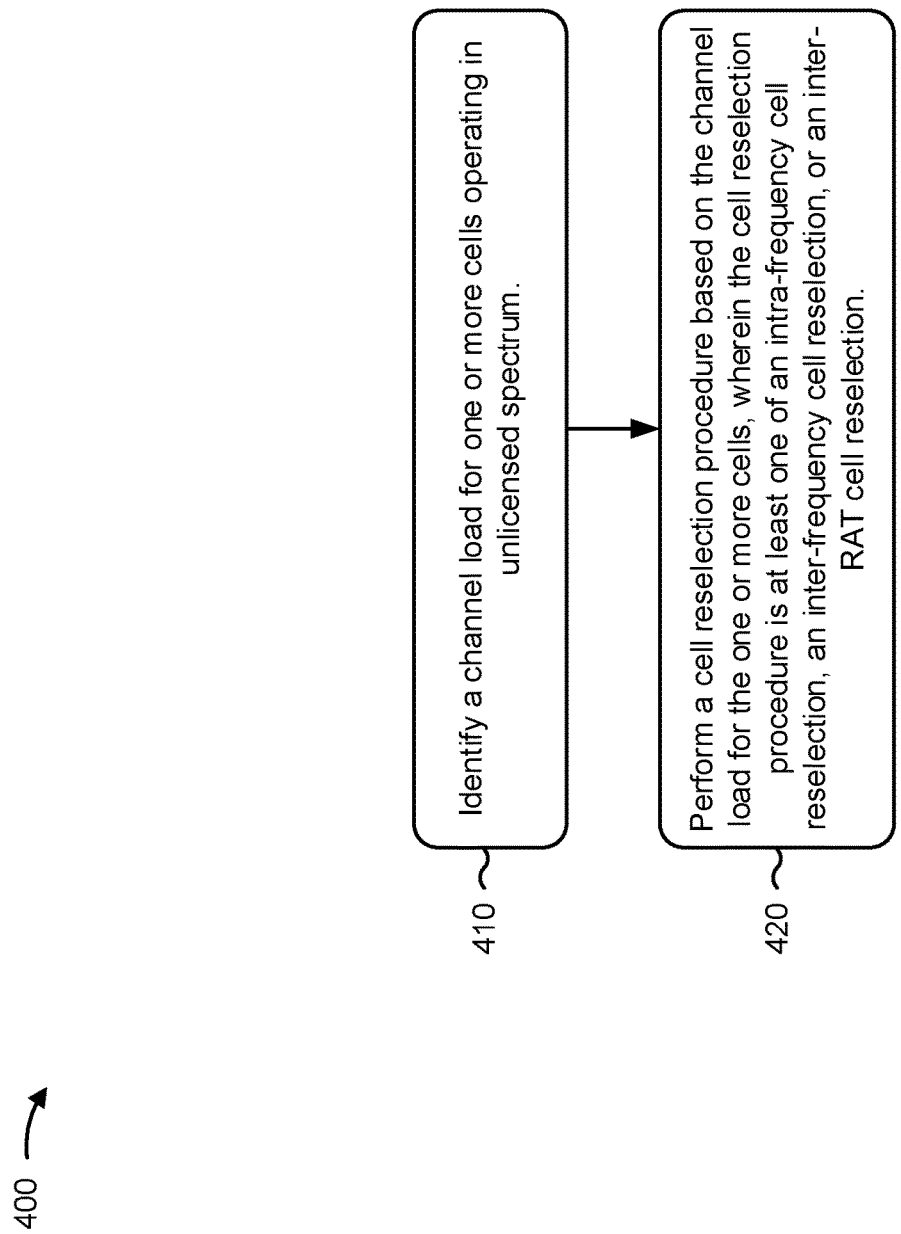
FIG. 4 is a diagram illustrating an example process performed, for example, by a UE.

The stored program codes, when executed by the controller/processor 280 or other processors and modules at the UE 120, may cause the UE 120 to perform operations described with respect to the process 400 of FIG. 4 or other processes as described herein.

In some aspects, the UE 120 may include means for identifying a channel load for one or more cells operating in unlicensed spectrum, means for performing a cell reselection procedure based on the channel load for the one or more cells, where the cell reselection procedure is at least one of an intra-frequency cell reselection, an inter-frequency cell reselection, or an inter-radio access technology (inter-RAT) cell reselection, or combinations thereof. In some aspects, such means may include one or more components of the UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3A:
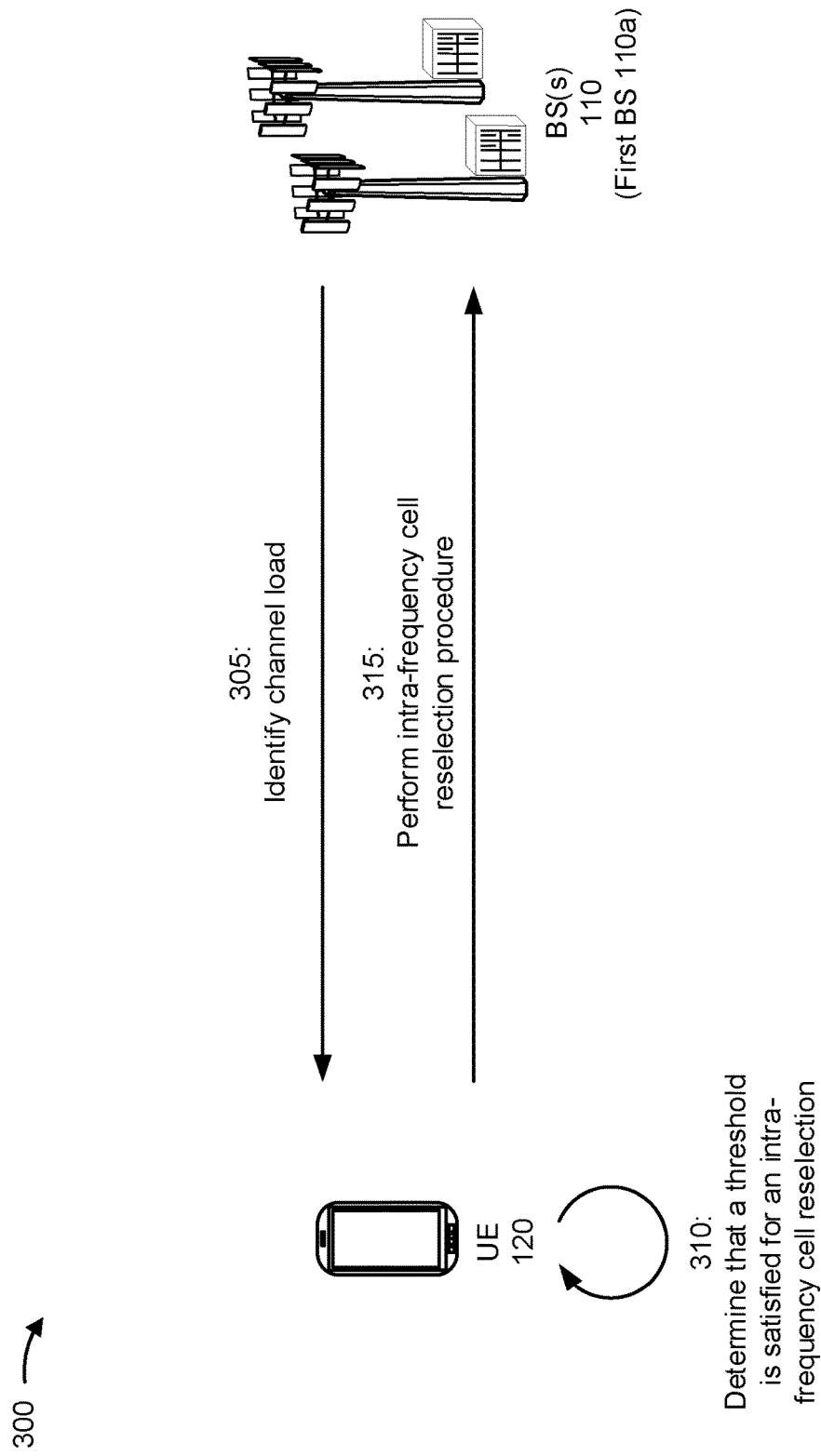
FIGS. 3A 3C are diagrams illustrating examples of channel load-based cell reselection procedures.
Figure 3B:
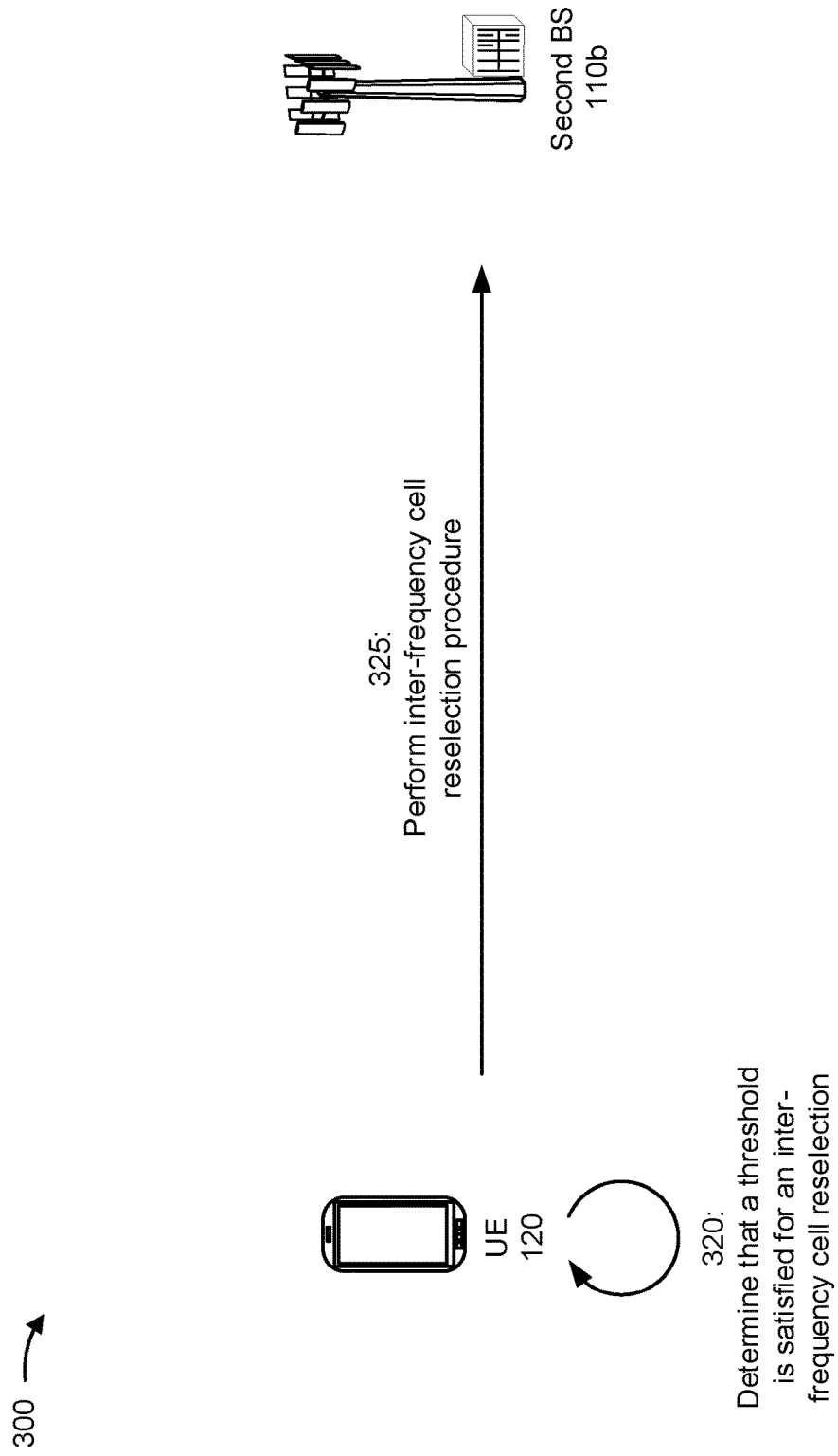
Figure 3C:
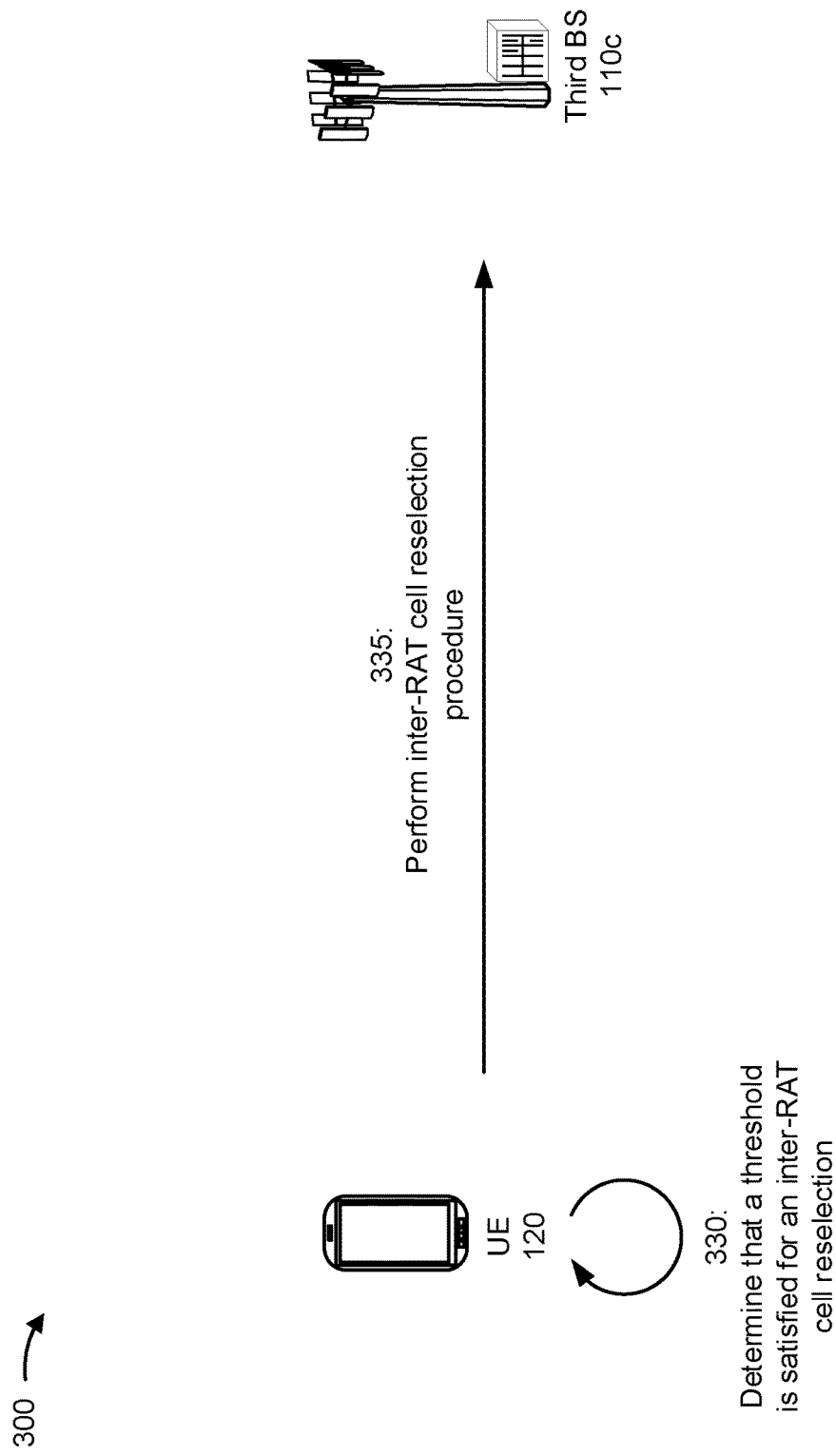

FIGS. 3A-3C are diagrams illustrating examples 300 of channel load-based cell reselection procedures. As shown in FIGS. 3A-3C, the examples 300 may include a UE 120 and one or more BSs 110, such as a first BS 110a, a second BS 110b, and a third BS 110c. In some aspects, the UE 120 and at least one of the one or more BSs 110a-c may communicate using unlicensed spectrum. For example, the UE 120 may communicate with a BS 110 using Wi-Fi, NR-unlicensed (NR-U), LTE in unlicensed spectrum (LTE-U), licensed assisted access (LAA), MuLTEfire, or further examples of unlicensed spectrum radio access technologies (RATs).

As shown in FIG. 3A, and by reference number 305, the UE 120 may identify a channel load. For example, the UE 120 may receive channel load information identifying the channel load from the one or more BSs 110a-c and regarding one or more cells provided by the one or more BSs 110a-c. For example, the UE 120 may receive information associated with identifying a threshold quantity of LBT failures, which correlate to a threshold channel load, a threshold total energy on a channel, or another metric. In this case, the UE 120 may receive the information via, for example, a system information block (SIB) message. Additionally, or alternatively, the UE 120 may perform one or more measurements to identify the channel load. In some aspects, the channel load may include information regarding a cell load or a cell quality. For example, the UE 120 may identify a received signal level (Srxlev), a cell selection quality (Squal), a cell load (Sload), or further examples of channel load parameters.

In some aspects, each of the one or more BSs 110a-c may provide information identifying a cell load for respective cells. Additionally, or alternatively, the first BS 110a may obtain information identifying a cell load for cells provided by other BSs 110b-c and may convey the information identifying the cell load information to the UE 120. In some aspects, the UE 120 may obtain threshold information relating to the channel load information. For example, the UE 120 may obtain information identifying one or more thresholds for determining whether to perform a particular type of cell reselection procedure with a particular cell. In this case, the one or more thresholds may include a threshold for performing intra-frequency cell measurements ($S_{IntraSearch}$), such as a signal level threshold ($S_{IntraSearchP}$), a cell quality threshold ($S_{IntraSearchQ}$), or a cell load threshold ($S_{IntraSearchL}$). Additionally, or alternatively, the UE 120 may obtain information identifying a threshold absolute value, such as one or more maximum cell load thresholds.

As further shown in FIG. 3A, and by reference number 310, the UE 120 may determine that a threshold is satisfied for an intra-frequency cell reselection. For example, the UE 120 may determine to perform an intra-frequency cell reselection based on determining that a signal level, a cell quality, or a cell load does not satisfy a respective threshold for a current cell. In contrast, when the signal level, cell quality, and cell load satisfy respective thresholds for the current cell, the UE 120 may determine not to perform an intra-frequency cell reselection.

In some aspects, the UE 120 may select one or more cells for performing an intra-frequency cell reselection procedure to attempt to reselect onto the one or more cells. For example, the UE 120 may select one or more cells with a cell load less than a maximum cell load threshold. In this case, the maximum cell load threshold may be determined based on information broadcast from a current cell on which the UE 120 is camping. In some aspects, the UE 120 may rank the one or more cells that satisfy the maximum cell load threshold. For example, the UE 120 may rank the one or more cells based on respective reference signal received powers (RSRPs), reference signal received qualities (RSRQs), or another parameter for ranking. In this case, the UE 120 may determine a cell list based on ranking the one or more cells and may use the cell list to perform a reselection procedure. In some aspects, based on ranking the one or more cells, the UE 120 may select a best ranked cell of the one or more cells for performing an intra-frequency cell reselection procedure. For example, based on determining that the best ranked cell is associated with a cell load that is less than another maximum cell load threshold (which may be determined based on information broadcast from the best ranked cell), the UE 120 may select the best ranked cell. Alternatively, the UE 120 may select a lower ranked cell, such as a next-best ranked cell, that is associated with a cell load that is less than a maximum cell load threshold broadcast by the lower ranked cell. In this case, the UE 120 may select such a lower ranked cell if the best ranked cell is not associated with a cell load that is less than the other maximum cell load threshold. In this way, the UE 120 avoids attempting to reselect onto a cell with a threshold level of congestion and accounts for different cells having different congestion capacities.

As further shown in FIG. 3A, and by reference number 315, the UE 120 may perform an intra-frequency cell reselection procedure. For example, the UE 120 may attempt to reselect onto a cell provided by the first BS 110a. In this case, the UE 120 may attempt to reselect onto a single cell (of the first BS 110a) and may cancel cell reselection if unsuccessful. Alternatively, and if cell reselection onto a cell provided by the first BS 110a is unsuccessful, the UE 120 may attempt to reselect onto another cell, such as another cell of first BS 110a or another cell of another BS 110. In some aspects, based on failing to reselect onto a cell during the intra-frequency cell reselection procedure, the UE 120 may perform another type of cell reselection procedure, such as an inter-frequency cell reselection procedure or an inter-RAT cell reselection procedure.

As shown in FIG. 3B, and by reference number 320, the UE 120 may determine to perform an inter-frequency cell reselection. For example, the UE 120 may determine to perform the inter-frequency cell reselection based on a failure of the intra-frequency cell reselection. Additionally, or alternatively, the UE 120 may determine to perform the inter-frequency cell reselection based on determining that one or more thresholds for performing the intra-frequency cell reselection were not satisfied.

In some aspects, the UE 120 may select a frequency on which to perform the inter-frequency cell reselection. For example, the UE 120 may determine a priority of a set of available frequencies and may select a higher priority frequency than a current frequency on which the UE 120 is camping. In some aspects, the UE 120 may select a frequency based on a channel load. For example, the UE 120 may select the higher priority frequency based on the higher priority frequency being associated with a channel load that is less than a channel load threshold. Additionally, or alternatively, the UE 120 may select the higher priority frequency based on a current frequency having a cell load that exceeds the channel load threshold. In contrast, when the UE 120 is using a current frequency and a current cell with a cell load that does not exceed the channel load threshold, the UE 120 may avoid selecting onto a higher priority frequency. In some aspects, the channel load threshold for the higher priority frequency and the current frequency may be the same channel load threshold or different channel load thresholds. In some aspects, the UE 120 may determine the channel load threshold based on receiving a broadcast from a current serving cell of the UE 120. In some aspects, the UE 120 may select the higher priority frequency based on the higher priority frequency having a channel load that is less than a channel load threshold during a particular time period during which the serving cell broadcasts the channel load threshold. In some aspects, the channel load threshold may be less than a cell load threshold for performing intra-frequency measurements ($S_{IntrasearchL}$).

In some aspects, the UE 120 may select a lower priority frequency than a current frequency on which the UE 120 is camping. For example, when the UE 120 does not detect a higher priority frequency or does not detect a higher priority frequency with a channel load satisfying a channel load threshold, the UE 120 may identify a lower priority frequency. In some aspects, the UE 120 may select the lower priority frequency when a current frequency or a current cell is associated with a channel load that is greater than the channel load threshold (the same channel load threshold as for the lower priority frequency or a different channel load threshold). In some aspects, the UE 120 may select the lower priority frequency based on the lower priority frequency having a channel load less than another channel load threshold (that is larger than the channel load threshold for higher priority frequencies).

As further shown in FIG. 3B, and by reference number 325, the UE 120 may perform an inter-frequency cell reselection procedure. For example, the UE 120 may attempt to reselect onto a cell provided by the second BS 110*b*. In this case, the UE 120 may attempt to reselect onto a single frequency (of second BS 110*b*) and may cancel cell reselection if unsuccessful. Alternatively, and if cell reselection onto a frequency provided by the second BS 110*b* is unsuccessful, the UE 120 may attempt to reselect onto another frequency, such as another frequency of second BS 110*b* or another frequency of another BS 110. In some aspects, based on failing to reselect onto a frequency during the inter-frequency cell reselection procedure, the UE 120 may perform another type of cell reselection procedure, such as an intra-frequency cell reselection procedure or an inter-RAT cell reselection procedure.

As shown in FIG. 3C, and by reference number 330, rather than performing an inter-frequency cell reselection, the UE 120 may determine to perform an inter-RAT cell reselection. For example, the UE 120 may determine to perform the inter-RAT cell reselection based on a failure of the intra-frequency cell reselection or the inter-frequency cell reselection. Additionally, or alternatively, UE 120 may determine to perform the inter-RAT cell reselection based on determining that one or more thresholds for performing the intra-frequency cell reselection or the inter-frequency cell reselection were not satisfied. For example, the UE 120 may determine to perform the inter-RAT cell reselection based on a cell signal level not satisfying the signal level threshold ($S_{IntraSearchP}$), a cell quality not satisfying the cell quality threshold ($S_{IntraSearchQ}$), or a cell load not satisfying the cell load threshold ($S_{IntrasearchL}$).

As further shown in FIG. 3C, and by reference number 335, the UE 120 may attempt to perform the inter-RAT cell reselection. For example, the UE 120 may attempt to reselect onto another RAT provided by the third BS 110*c*. In this case, UE 120 may attempt to reselect from an NR RAT to an LTE RAT or a Wi-Fi RAT, an LTE RAT to an NR RAT or a Wi-Fi RAT, or a further example of an inter-RAT reselection.

FIG. 4 is a diagram illustrating an example process 400 performed, for example, by a UE. The example process 400 shows where a UE, such as UE 120, performs operations associated with channel load-based cell reselection procedures.

As shown in FIG. 4, in some aspects, process 400 may include identifying a channel load for one or more cells operating in unlicensed spectrum (block 410). For example, the UE (using receive processor 258, transmit processor 264, controller/processor 280, or memory 282) may identify a channel load for one or more cells operating in unlicensed spectrum. In some aspects, the UE may include a first interface for identifying the channel load.

As shown in FIG. 4, in some aspects, process 400 may include performing a cell reselection procedure based on the channel load for the one or more cells, where the cell reselection procedure is at least one of an intra-frequency cell reselection, an inter-frequency cell reselection, or an inter-RAT cell reselection (block 420). For example, the UE (using receive processor 258, transmit processor 264, controller/processor 280, or memory 282) may perform a cell reselection procedure based on the channel load for the one or more cells. In some aspects, the cell reselection procedure is at least one of an intra-frequency cell reselection, an inter-frequency cell reselection, or an inter-RAT cell reselection. In some aspects, the UE may include a second interface for performing the cell reselection procedure.

The process 400 may include additional aspects, such as any single implementation or any combination of aspects described below or in connection with one or more other processes described elsewhere herein. In some aspects, the UE may include one or more other interfaces or one or more processing systems for performing any single implementation or any combination of aspects described below or in connection with one or more other processes described elsewhere herein.

In a first aspect, performing the cell reselection procedure includes performing the cell reselection procedure based on whether a received signal level satisfies a threshold for performing intra-frequency cell measurements.

In a second aspect, alone or in combination with the first aspect, performing the cell reselection procedure includes performing the cell reselection procedure based on whether a cell selection quality value satisfies a threshold for performing intra-frequency cell measurements.

In a third aspect, alone or in combination with any one or more of the first and second aspects, performing the cell reselection procedure includes performing the cell reselection procedure based on whether a cell load value satisfies a threshold for performing intra-frequency cell measurements.

In a fourth aspect, alone or in combination with any one or more of the first through third aspects, the process 400 may include determining a cell list for the cell reselection procedure based on whether the channel load of the one or more cells satisfies a load threshold received from a cell on which the UE is camping.

In a fifth aspect, alone or in combination with any one or more of the first through fourth aspects, the process 400 may include ranking the one or more cells for the cell reselection procedure based on a ranking procedure.

In a sixth aspect, alone or in combination with any one or more of the first through fifth aspects, the process 400 may include selecting a particular cell, of the one or more cells, with a highest ranking based on whether the channel load for the particular cell satisfies a threshold received from the particular cell.

In a seventh aspect, alone or in combination with any one or more of the first through sixth aspects, the process 400 may include selecting a particular cell, of the one or more cells, for the cell reselection procedure based on a camping criterion for the channel load.

In an eighth aspect, alone or in combination with any one or more of the first through seventh aspects, the process 400 may include selecting a higher priority frequency than a current frequency for the cell reselection procedure based on whether the channel load for the higher priority frequency satisfies a threshold for performing intra-frequency cell measurements received from a serving cell and based on the channel load for the current frequency or a current cell.

In a ninth aspect, alone or in combination with any one or more of the first through eighth aspects, the process 400 may include selecting a higher priority frequency than a current frequency for the cell reselection procedure based on whether the channel load for the higher priority frequency satisfies a threshold during a reselection time period during which the threshold is received by the UE as a broadcast from a serving cell and based on the channel load for the current frequency or a current cell.

In a tenth aspect, alone or in combination with any one or more of the first through ninth aspects, process 400 may include selecting a lower priority frequency than a current frequency for the cell reselection procedure based on whether the channel load for the lower priority frequency satisfies a threshold and an availability of one or more other frequencies and based on the channel load for the current frequency or a current cell.

In an eleventh aspect, alone or in combination with any one or more of the first through tenth aspects, performing the cell reselection procedure includes performing the inter-RAT cell reselection based on determining that each cell, of the one or more cells, does not satisfy one or more cell reselection criteria for the intra-frequency cell reselection or the inter-frequency cell reselection.

In a twelfth aspect, alone or in combination with any one or more of the first through eleventh aspects, the channel load is determined based on at least one of an amount of interference on a channel, a total energy on the channel, or a quantity of LBT failures for uplink or downlink on the channel.

In a thirteenth aspect, alone or in combination with any one or more of the first through twelfth aspects, a ranking of cells is based on the channel load.

Although FIG. 4 shows example blocks of the process 400, in some aspects, the process 400 may include additional blocks, fewer blocks, different blocks, or differently arranged blocks than those depicted in FIG. 4. Additionally, or alternatively, two or more of the blocks of the process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (one or more modules of computer program instructions), encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures, and indicate relative positions corresponding to the orientation of the Figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
    identifying a channel load for one or more first cells operating in unlicensed spectrum; and
    performing a cell reselection procedure based on the channel load for the one or more first cells and threshold information received from a first cell, of the one or more first cells, on which the UE is camping,
        wherein the cell reselection procedure comprises an intra-frequency cell reselection when a cell load value does not satisfy a threshold identified in the threshold information received from the first cell, and
        wherein performing the intra-frequency cell reselection comprises:
            ranking one or more second cells that satisfy a first maximum cell load threshold identified in the threshold information received from the first cell, and
            selecting a second cell, of the one or more second cells, with based on the second cell having a highest ranking of the one or more second cells and based on a cell load for the second cell satisfying a second maximum cell load threshold identified in a broadcast from the second cell.

2. The method of claim 1, wherein the intra-frequency cell reselection is performed when a received signal level does not satisfy another threshold, identified in the threshold information received from the first cell, for performing intra-frequency cell measurements.

3. The method of claim 1, wherein the intra-frequency cell reselection is performed when a cell selection quality value does not satisfy another threshold, identified in the threshold information received from the first cell, for performing intra-frequency cell measurements.

4. The method of claim 1, further comprising:
    determining a cell list for the cell reselection procedure based on whether the channel load of the one or more first cells satisfies a load threshold identified in the threshold information received from the first cell.

5. The method of claim 1, wherein the ranking is further based on the channel load.

6. The method of claim 1, wherein selecting the second cell comprises:
    selecting the second cell for the cell reselection procedure based on a camping criterion for the channel load.

7. The method of claim 1, further comprising:
    selecting a higher priority frequency than a current frequency for the cell reselection procedure based on whether a channel load for the higher priority frequency satisfies another threshold, identified in the threshold information received from the first cell, for performing intra-frequency cell measurements and based on a channel load for the current frequency or a current cell.

8. The method of claim 1, further comprising:
    selecting a higher priority frequency than a current frequency for the cell reselection procedure based on whether a channel load for the higher priority frequency satisfies another threshold, identified in the threshold information received from the first cell, during a reselection time period during which the other threshold is received by the UE as a broadcast from a serving cell and based on a channel load for the current frequency or a current cell.

9. The method of claim 1, further comprising:
    selecting a lower priority frequency than a current frequency for the cell reselection procedure based on whether a channel load for the lower priority frequency satisfies another threshold, identified in the threshold information received from the first cell, and an availability of one or more other frequencies and based on a channel load for the current frequency or a current cell.

10. The method of claim 1, wherein performing the cell reselection procedure comprises:
    performing an inter-radio access technology (inter-RAT) cell reselection based on determining that each cell, of the one or more second cells, does not satisfy one or more cell reselection criteria for the intra-frequency cell reselection or an inter-frequency cell reselection.

11. The method of claim 1, wherein the channel load is determined based on at least one of:
    an amount of interference on a channel,
    a total energy on the channel, or
    a quantity of listen-before-talk (LBT) failures for uplink or downlink on the channel.

12. The method of claim 1, wherein selecting the second cell comprises:
    selecting the second cell based on the cell load for the second cell being less than the second maximum cell load threshold identified in the broadcast from the second cell.

13. The method of claim 1, wherein ranking the one or more second cells comprises:

ranking the one or more second cells based on one or more of reference signal received powers (RSRPs) associated with the one or more second cells or reference signal received qualities (RSRQs) associated with the one or more second cells.

14. An apparatus of a user equipment (UE) for wireless communication, comprising:
a processing system configured to:
identify a channel load for one or more first cells operating in unlicensed spectrum; and
perform a cell reselection procedure based on the channel load for the one or more first cells and threshold information received from a first cell, of the one or more first cells, on which the UE is camping,
wherein the cell reselection procedure comprises an intra-frequency cell reselection when a cell load value does not satisfy a threshold, identified in the threshold information received from the first cell, and
wherein the processing system, to perform the intra-frequency cell reselection, is configured to:
rank one or more second cells that satisfy a first maximum cell load threshold identified in the threshold information received from the first cell, and
select a second cell, of the one or more second cells, with based on the second cell having a highest ranking of the one or more second cells and based on a cell load for the second cell satisfying a second maximum cell load threshold identified in a broadcast from the second cell.

15. The apparatus of claim 14, wherein the intra-frequency cell reselection is performed when a received signal level does not satisfy another threshold, identified in the threshold information received from the first cell, for performing intra-frequency cell measurements.

16. The apparatus of claim 14, wherein the intra-frequency cell reselection is performed when a cell selection quality value does not satisfy another threshold, identified in the threshold information received from the first cell, for performing intra-frequency cell measurements.

17. The apparatus of claim 14, wherein the processing system is further configured to:
determine a cell list for the cell reselection procedure based on whether the channel load of the one or more first cells satisfies a load threshold identified in the threshold information received from the first cell.

18. The apparatus of claim 14, wherein the ranking is further based on the channel load.

19. The apparatus of claim 14, wherein the processing system, to select the second cell, is further configured to:
select the second cell for the cell reselection procedure based on a camping criterion for the channel load.

20. The apparatus of claim 14, wherein the processing system is further configured to:
select a higher priority frequency than a current frequency for the cell reselection procedure based on whether a channel load for the higher priority frequency satisfies another threshold, identified in the threshold information received from the first cell, for performing intra-frequency cell measurements and based on a channel load for the current frequency or a current cell.

21. The apparatus of claim 14, wherein the processing system is further configured to:

select a lower priority frequency than a current frequency for the cell reselection procedure based on whether a channel load for the lower priority frequency satisfies another threshold, identified in the threshold information received from the first cell, and an availability of one or more other frequencies and based on a channel load for the current frequency or a current cell.

22. The apparatus of claim 14, wherein the processing system is further configured to:
perform an inter-radio access technology (inter-RAT) cell reselection based on determining that each cell, of the one or more second cells, does not satisfy one or more cell reselection criteria for the intra-frequency cell reselection or an inter-frequency cell reselection.

23. The apparatus of claim 14, wherein the processing system, to perform the intra-frequency cell reselection, is configured to:
select a third cell, of the one or more second cells, with a lower ranking than the second cell based on the cell load for the second cell not satisfying the second maximum cell load threshold identified in the broadcast from the second cell.

24. The apparatus of claim 14, wherein the processing system, to rank the one or more second cells, is configured to:
rank the one or more second cells based on one or more of reference signal received powers (RSRPs) associated with the one or more second cells or reference signal received qualities (RSRQs) associated with the one or more second cells.

25. A non-transitory computer-readable medium storing one or more instructions for wireless communication, the one or more instructions comprising:
one or more instructions that, when executed by one or more processors of a user equipment (UE), cause the UE to:
identify a channel load for one or more first cells operating in unlicensed spectrum; and
perform a cell reselection procedure based on the channel load for the one or more first cells and threshold information received from a first cell, of the one or more first cells, on which the UE is camping,
wherein the cell reselection procedure comprises an intra-frequency cell reselection when a cell load value does not satisfy a threshold, identified in the threshold information received from the first cell, and
wherein the one or more instructions, that cause the one or more processors to perform the intra-frequency cell reselection, cause the one or more processors to:
rank one or more second cells that satisfy a first maximum cell load threshold identified in the threshold information received from the first cell, and
select a second cell, of the one or more second cells based on the second cell having a highest ranking of the one or more second cells and based on a cell load for the second cell satisfying a second maximum cell load threshold identified in a broadcast from the second cell.

26. The non-transitory computer-readable medium of claim 25, wherein the intra-frequency cell reselection is performed when a received signal level value does not satisfy another threshold, identified in the threshold information received from the first cell, for performing intra-frequency cell measurements.

27. The non-transitory computer-readable medium of claim 25, wherein the intra-frequency cell reselection is performed when a cell selection quality value does not satisfy another threshold, identified in the threshold information received from the first cell, for performing intra-frequency cell measurements.

28. An apparatus for wireless communication, comprising:
    means for identifying a channel load for one or more first cells operating in unlicensed spectrum; and
    means for performing a cell reselection procedure based on the channel load for the one or more first cells and threshold information received from a first cell, of the one or more first cells, on which the apparatus is camping,
        wherein the cell reselection procedure comprises an intra-frequency cell reselection when a cell load value does not satisfy a threshold, identified in the threshold information received from the first cell, and
        wherein the means for performing the intra-frequency cell reselection comprises:
            means for ranking one or more second cells that satisfy a first maximum cell load threshold identified in the threshold information received from the first cell, and
            means for selecting a second cell, of the one or more second cells based on the second cell having a highest ranking of the one or more second cells and based on a cell load for the second cell satisfying a second maximum cell load threshold identified in a broadcast from the second cell.

29. The apparatus of claim 28, wherein the intra-frequency cell reselection is performed when a received signal level does not satisfy another threshold, identified in the threshold information received from the first cell, for performing intra-frequency cell measurements.

30. The apparatus of claim 28, wherein the intra-frequency cell reselection is performed when a cell selection quality value does not satisfy another threshold, identified in the threshold information received from the first cell, for performing intra-frequency cell measurements.

* * * * *